March 26, 1957 R. W. KENNEY 2,786,420
PRESSURE CONTROLLED PUMP

Filed March 27, 1952 3 Sheets-Sheet 1

INVENTOR.
ROBERT W. KENNEY
BY
Chas. C. Reif
ATTORNEY

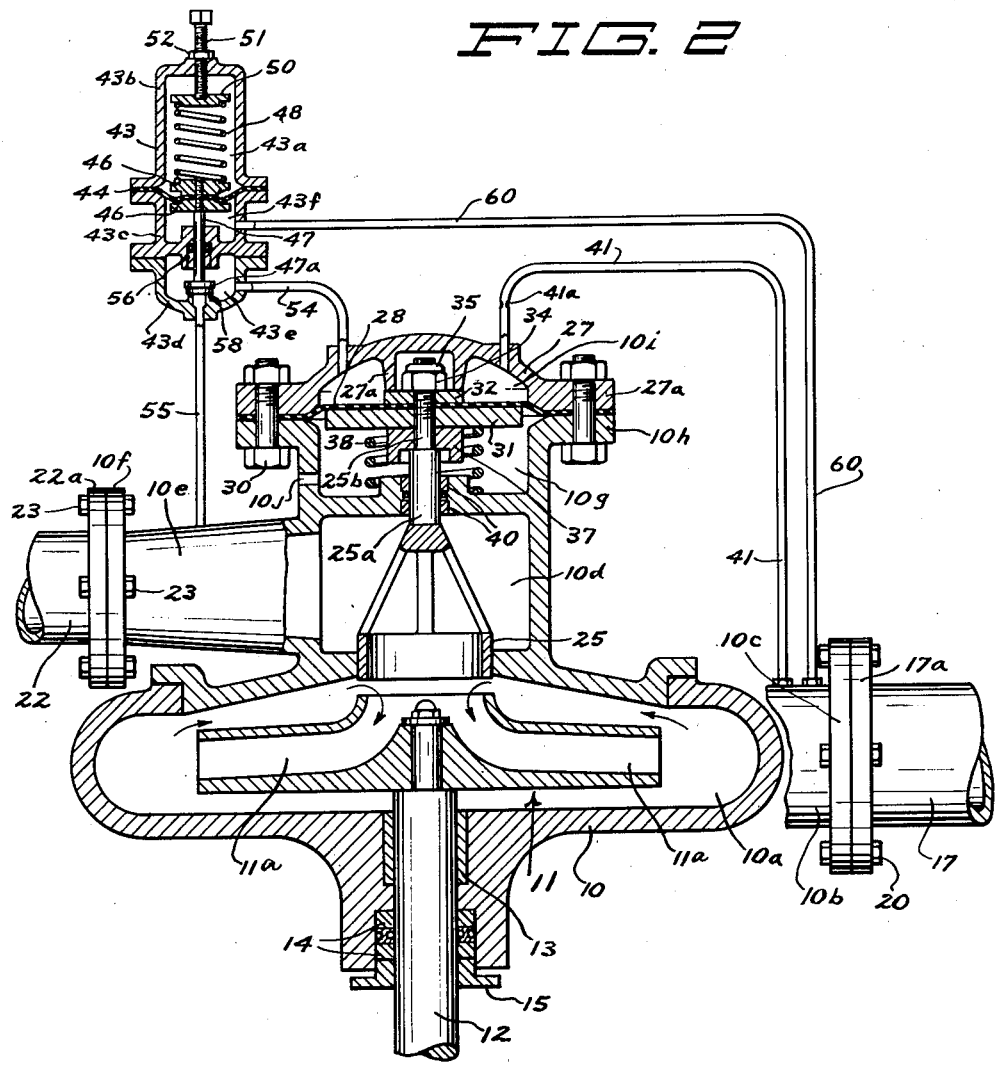

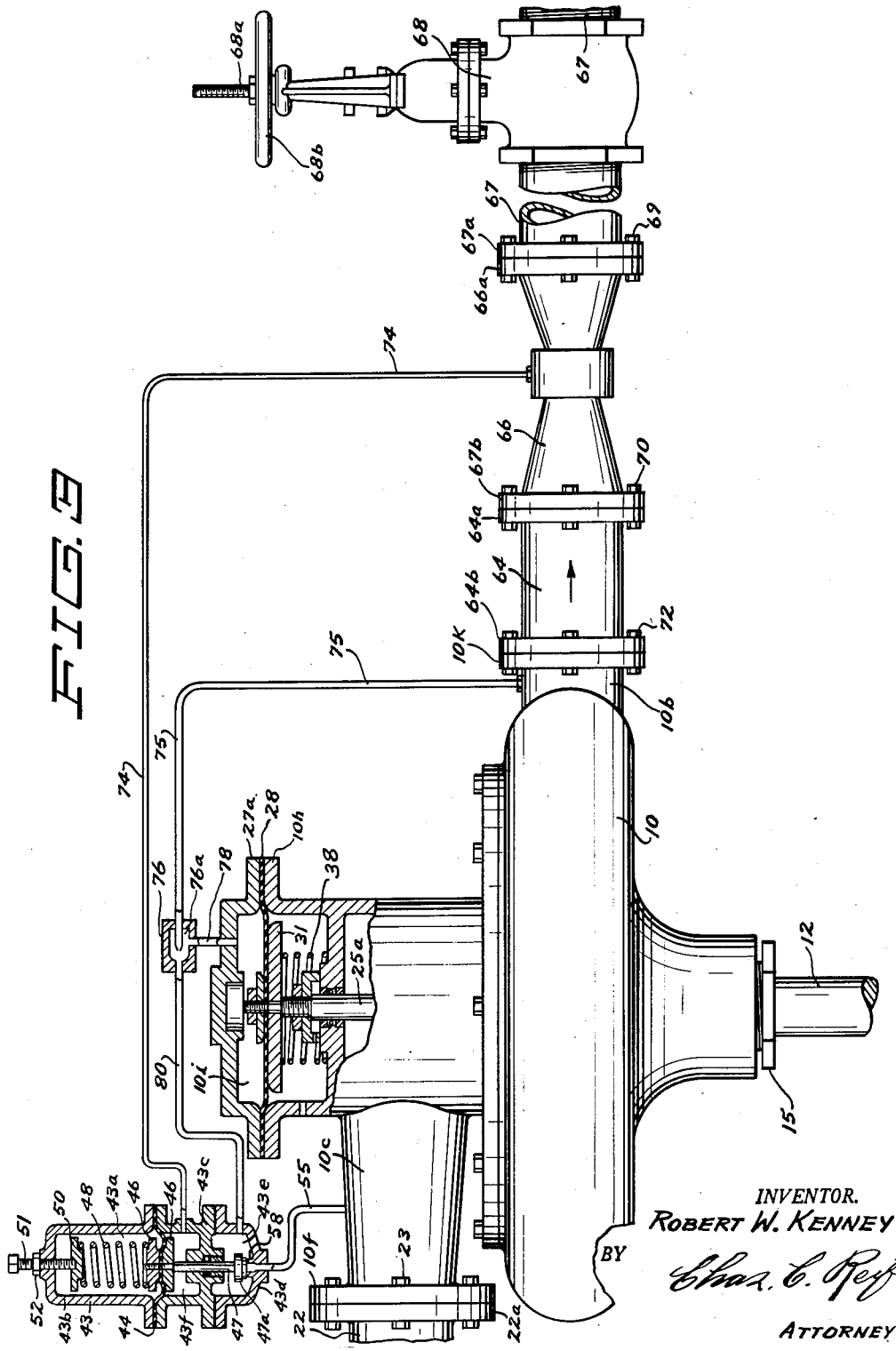

United States Patent Office 2,786,420
Patented Mar. 26, 1957

2,786,420

PRESSURE CONTROLLED PUMP

Robert W. Kenney, South Pasadena, Calif., assignor to Stanley G. Harwood, South Pasadena, Calif.

Application March 27, 1952, Serial No. 278,789

6 Claims. (Cl. 103—97)

This invention relates to a pump and particularly to a pressure controlled pump.

It is an object of this invention to provide a pump for moving fluid or liquid with a control means therefor acting to produce a discharge from said pump which will be at a constant pressure as long as the demand at said pump discharge remains constant.

It is a further object of the invention to provide a pump with a pressure operated control means for maintaining a constant pressure of discharge for different volumes of flow.

It is also an object of the invention to provide a pump having a fluid-moving means or impeller, an inlet portion and a discharge portion, and means for varying the delivery of fluid from said impeller comprising a member which is movable in one direction by the pressure in said discharge portion and is movable in the opposite direction by a resilient means such as a spring.

It is still another object of the invention to provide a pump having a chamber in which a fluid-moving means such as an impeller is disposed, an inlet portion and a discharge portion, together with a member for varying the supply of fluid to said impeller, a second chamber, a second member in said second chamber movable in one direction by the pressure in said discharge portion and movable in the opposite direction by a resilient means, said member being connected to said first mentioned member for moving the same, a conduit connecting said discharge portion and said second chamber for supplying pressure to move said second member, and means connecting said second chamber and said inlet portion for discharging fluid from said second chamber to permit said resilient means to move said second member.

It is another object of the invention to provide such a device as set forth in the preceding paragraph, together with a third chamber, a third member in said third chamber movable in one direction by the pressure in said discharge portion, and movable in the opposite direction by resilient means, said member acting to control the flow of fluid through said means connecting said second chamber and said inlet portion.

These and other objects and advantages of the invention will be fully set forth in the following description made in connection with the accompanying drawings in which like reference characters refer to similar parts throughout the several views and in which:

Fig. 2 is a view showing the pump illustrated in Fig. 1 in horizontal section except for a portion of the discharge conduit thereof; and Fig. 3 is a view partly in plan and partly in horizontal section showing a modification.

Figure 1:
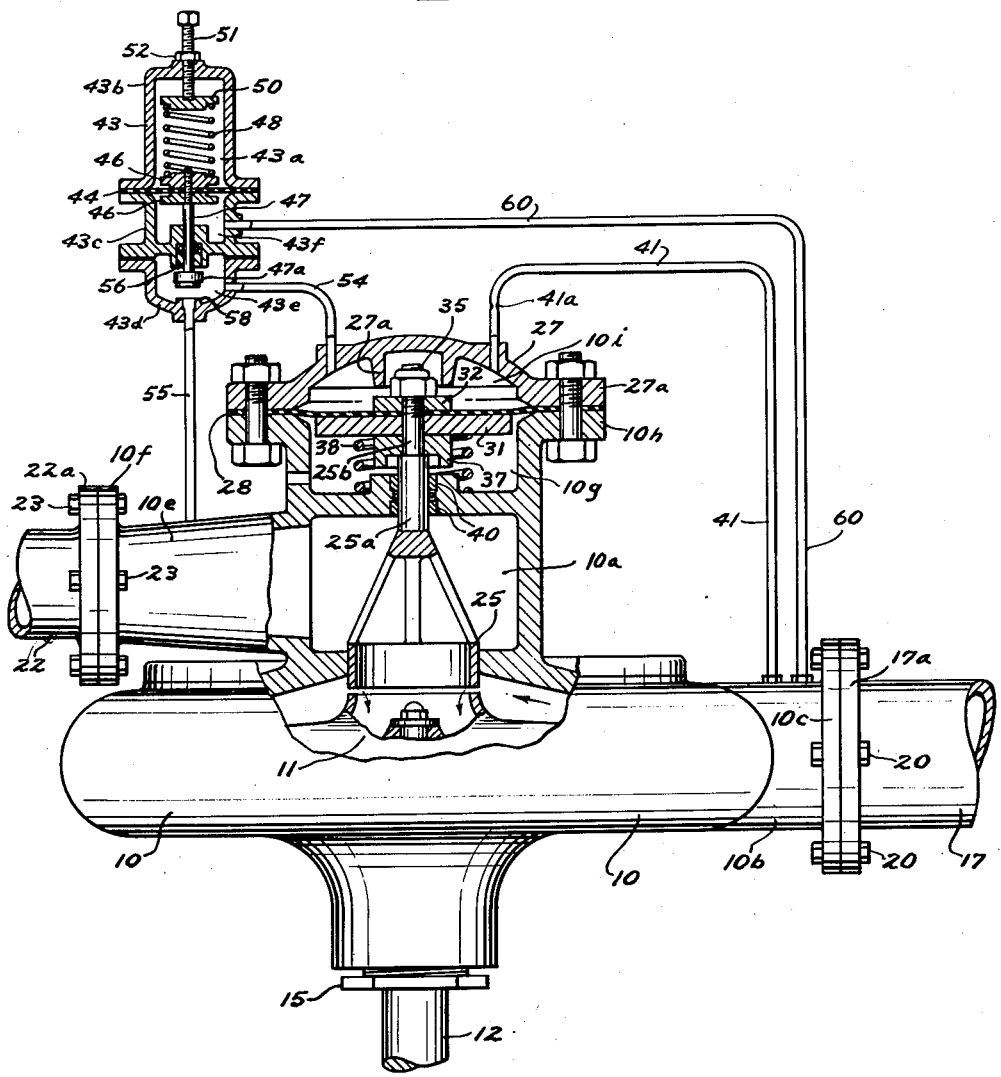
Fig. 1 is a view partly in plan and partly in horizontal section showing the pump of this invention.

Referring to the drawings, particularly Figs. 1 and 2, a pump is shown comprising a casing 10 having therein a chamber 10a. A fluid-moving means is provided, and while this could take various forms depending on the type of pump used, in the embodiment of the invention illustrated, said fluid-moving means is shown as a shrouded rotary impeller 11 having passages therethrough disposed in chamber 10a, the same being secured to a driving shaft 12 journaled in a suitable bearing 13 in casing 10. Packing material 14 is shown surrounding shaft 12 in a chamber in one end of casing 10, the same being held in position by a packing gland 15 which will be connected in any suitable manner to casing 10. Shaft 12 will of course be driven by suitable means such as a motor. Casing 10 has a discharge portion or outlet 10b to which is connected a discharge conduit 17. Portion 10b and conduit 17 have mating flanges 10c and 17a respectively connected by a number of circumferentially spaced headed and nutted bolts 20. Casing 10 has said chamber 10a therein with which communicates the inlet portion 10e to which is connected the inlet conduit 22. Portion 10e and conduit 22 have mating flanges 10f and 22a connected by a number of circumferentially spaced headed and nutted bolts 23. Casing 10 has an opening between chambers 10a and 10d in which is movable a member 25. While member 25 could be variously formed, it is shown as a cylinder or sleeve which is moved toward and from impeller 11 to vary the rate of flow to impeller 11. Impeller 11 is shown as having a plurality of channels 11a having their outlets at the periphery of said impeller and having their inlets adjacent member 25.

Casing 10 also comprises a chamber 10g, and casing 10 has a flange 10h extending outwardly from one side of said chamber. A cover member 27 has a flange 27a mating with flange 10h. A flexible diaphragm 28 is disposed between flanges 10h and 27a and extends across chamber 10g. Flanges 10h and 27a are connected by a plurality of headed and nutted bolts 30. A chamber 10i is thus formed between diaphragm 28 and cover member 27. A vent aperture 10j extends from casing 10g to the atmosphere. Member 25 has at one end thereof a cylindrical portion or shaft 25a, said portion having terminal reduced portion 25b extending through diaphragm 28 and plates 31 and 32 at either side of said diaphragm, said portion 25b being equipped with a nut 34 and a locking pin 35. Members 34 and 35 are disposed in a recess formed by an annular flange 27a at the central portion of cover 27. A cup-shaped member 37 engages the side of plate 31 remote from diaphragm 28 and has a recess therein the bottom of which is engaged by the shoulder formed between portions 25a and 25b. Members 32, 28, 31 and 37 are thus firmly held together by nut 34. Portion 25a is longitudinally slidable through packing material 40 disposed in casing 10 and specifically in the partition between chambers 10d and 10g. A conduit 41 connects the discharge portion 10b to chamber 10i at the left of diaphragm 28, as shown in Fig. 2, said conduit being secured to cover 27. Said conduit 41 has an orifice 41a therein adjacent said cover 27. Disposed about member 37 is a compression coiled spring 38 engaging the lower partition of chamber 10g at one end and engaging plate member 31 at its other end.

A casing 43 is provided having therein a chamber 43a. Casing 43 has parts 43b, 43c and 43d. Parts 43b and 43c have mating flanges between which is clamped a flexible diaphragm 44. Said diaphragm has at either side thereof in casing 43a, plates 46 held in place by the threaded end of a rod 47. A compression coiled spring 48 engages one plate 46 and at its other end engages a plate 50 which is engaged at its opposite side by a headed screw 51 threaded into the end of casing 43 and equipped with a lock nut 52. Portions 43c and 43d have mating flanges and these flanges as well as the flanges on portions 43c and 43b will be connected in any suitable manner, as by a plurality of circumferentially spaced bolts. Portion 43d has therein a chamber 43e. A conduit 54 connects chamber 43e and chamber 10i at the left of diaphragm 28, as shown in Fig. 2. A conduit 55 connects one end of chamber 43e to the inlet portion 10e of casing 10. Rod 47 has a portion of larger diameter than the threaded portions in members 46 and the shoulder formed between said portions engages the plate 46 at the right, as shown in Figs. 1 and 2. Said rod 47 passes through packing material 56 disposed in a hub formed at the end of portion 43c. A seat member 58 is formed at the inner end of the opening in portion 43d with which conduit 55 communicates. Rod 47 has an enlarged portion 47a at its end adapted to engage member 58 and portion 47a may comprise resilient material. A conduit 60 connects the discharge portion 10b of the pump with the chamber 43f at the right of diaphragm 44.

In operation, the impeller 11 will be driven by shaft 12 and the fluid will be drawn into said impeller through portion 10e and chamber 10a and will be discharged through portion 10b and discharge conduit 17. Member 25 controls the amount of fluid flowing from pump chamber 10a into impeller 11.

Starting with the pump at rest, there would be no pressure in the discharge portion 10b. At this time spring 38 has moved the diaphragm assembly and plate 32 engages the end of flange 27a, which latter acts as a stop. Member 25 will be moved away from impeller 11, thus widening the gap therebetween. Spring 48 in casing 43 has moved the diaphragm assembly to bring portion 47a against member 58 and shut off communication between chamber 43e and conduit 55. When the pump is started, pressure will increase in the pump discharge portion or outlet 10b and fluid will flow through conduit 41 and orifice 41a into chamber 10i at the left of diaphragm 28 and thus pressure is transmitted through said conduit 41. This fluid can pass through conduit 54 into chamber 43e. Pressure will increase in the chamber 10i at the left of diaphragm 28 and when this pressure becomes sufficient, it will move the diaphragm assembly against the pressure of spring 38 and will thus move shaft 25a and member 25 toward the impeller 11. Member 25 will then diminish the gap between member 25 and impeller 11 and this will reduce the flow of fluid into impeller 11 from pump chamber 10a. This reduction of the flow of fluid will increase the pressure in the discharge portion 10b. The increased pressure in the discharge portion 10b is transmitted through conduit 60 to chamber 43f in casing 43. When this pressure becomes sufficient it will move the diaphragm assembly of diaphragm 44 to the left, as shown in Figs. 1 and 2, against the pressure of spring 48. This will move rod 47 and portion 47a will be moved away from member 58 so that fluid can now pass from chamber 43e, through conduit 55 to the inlet portion 10e and pump chamber 10a of casing 10. The pressure in chamber 10i will become balanced with the pressure of spring 38 in chamber 10g so that the gap between member 25 and the impeller will remain constant and the pressure in the discharge portion 10b will then remain constant as long as the demand at the pump discharge or the volume remains constant. If the demand at the outlet or pump discharge decreases, the pressure in the discharge portion 10b will increase and will be transmitted through conduit 60. When this pressure becomes sufficient it will move the assembly of diaphragm 44 further to the left against spring 48 and more fluid will be permitted to pass through conduit 55 to inlet portion 10e and thus from chamber 10i. This will reduce the pressure in chamber 10i and spring 38 will move diaphragm 28 to the left, thus moving member 25 away from impeller 11 and permitting more fluid to pass to impeller 11 from pump chamber 10a. This increase of the flow of fluid into said impeller 11 will decrease the pressure in said discharge portion 10b. The pressure in the pump discharge portion 10b will thus be held substantially constant by the variable movement of member 25 toward and away from impeller 11.

In Fig. 3 the structure is the same except that the discharge portion 10b is connected to a discharge conduit 64 and a casing 66 is connected to conduit 64, which casing is formed as a Venturi tube. Casing 66 is connected to a further discharge conduit 67 in which will be disposed a gate valve 68 of standard construction. Said gate valve has a valve rod 68a with which cooperates an operating hand wheel 68b. Further description of said gate valve is deemed unnecessary. The conduit 67 and Venturi tube 66 have mating flanges 67a and 66a which are connected by a plurality of circumferentially spaced headed bolts 69. Venturi casing 66 and conduit 64 have mating flanges 67b and 64a which are connected by a plurality of circumferentially spaced headed and nutted bolts 70. Conduit 64 and discharge portion 10b have mating flanges 64b and 10k which are connected by a plurality of circumferentially spaced headed and nutted bolts 72. The contracted portion of the Venturi tube is connected by a conduit 74 to the chamber 43f. The discharge portion 10b is connected by a conduit 75 to the casing 76 of an ejector. Casing 76 has a chamber 76a with which conduit 75 communicates and said chamber is connected by a conduit 78 to chamber 10i of the pump. Chamber 76a is connected by a conduit 80 to chamber 43e.

It will be seen that chamber 10i is connected through conduits 78 and 80 to chamber 43e.

The operation of the structure shown in Fig. 3 is the same as that already described, except that the chamber 43f is now connected to the Venturi tube instead of the discharge portion 10b. This does not vary the operation. The Venturi tube 66 is calibrated so that at any given flow the pressure drop at the Venturi throat or at the contraction thereof is equal to the line loss between the Venturi tube and the discharge side of gate valve 68. Reduction of pressure at the Venturi throat will cause a reduction of pressure in chamber 43f and the operation continues as above described.

Also the structure in Fig. 3 shows the use of an ejector instead of the orifice 41a in conduit 41. Said ejector communicates directly with chamber 43e through conduit 80. Fluid flowing through said ejector has a high velocity flow which will cause a reduction of pressure in conduit 78 and will withdraw liquid from chamber 10i. This action will permit spring 38 to move diaphragm 28 to the left and thus member 25 is moved away from impeller 11. From this point the operation continues as described above.

From the above description it will be seen that I have provided a simple and efficient means for regulating the discharge pressure of the pump. The pressure control disclosed eliminates the necessity for installing a pressure reducing valve or a pressure relief valve at the discharge end of the pump. This saves much labor and material as well as weight and space. It will be noted that the pressure of spring 48 can be varied by rotating screw 51. This of course will vary the flow through conduit 55 and the discharge pressure and rate of flow can thus be controlled. Since the discharge pressure is controlled, the pump can be used to maintain a constant pressure or level in liquid containers. The present pump can also be used in connection with a barometric condenser to maintain a constant level in the tail pipe by having the discharge pressure and volume adjusted to be the same as the flow into said tail pipe.

The device has been amply demonstrated in actual practice and found to be very successful and efficient.

It will of course be understood that various changes may be made in the form, details, arrangement and proportions of the parts, without departing from the scope of applicant's invention which generally stated, consists in a device capable of carrying out the objects above set forth, in the parts and combinations of parts disclosed and defined in the appended claims.

What is claimed is:

1. A pump control means having in combination, a pump comprising a casing having a plurality of chambers therein, a shrouded impeller rotatably located in one of said chambers, said chamber having an inlet and an outlet, said impeller having a central opening thereinto, said inlet being in alignment with said opening and adjacent thereto but spaced axially therefrom, a second chamber in said casing, a member in said second chamber having a portion having a closely sliding fit with the walls of said inlet and movable therethrough and adapted to engage the impeller shroud about said opening in one position and to move away from said opening in another direction to vary the gap between said inlet and said opening into said impeller to control the flow of fluid into said impeller, a third chamber in said casing, a member in said third casing connected to said first mentioned member and movable by pressure in one direction, a resilient means in said third chamber for moving said second mentioned member and first mentioned member in the opposite direction, a conduit connecting said outlet and said third mentioned chamber for transmitting pressure to said second mentioned member to compress said resilient means, a second casing having a fourth chamber therein, a third member in said fourth chamber movable in one direction by pressure, a resilient means in said second mentioned casing for moving said third mentioned member in the opposite direction, a conduit connecting said outlet and said fourth mentioned chamber for transmitting pressure to said third mentioned member to compress said second resilient means, a fifth chamber in said second mentioned casing adjacent said fourth mentioned chamber, a third conduit connecting said third mentioned chamber with said fifth mentioned chamber and a fourth conduit connecting said fifth mentioned chamber with said second mentioned chamber.

2. The structure set forth in claim 1, and means moved by said second mentioned resilient means for closing said fourth mentioned conduit to prevent the passage of fluid therethrough.

3. A pump control means having in combination, a pump comprising a casing having a chamber therein, said chamber having an inlet and an outlet, a shrouded impeller rotatably located in said chamber and having a central opening thereinto, said inlet being in alignment with and adjacent to said opening, a second chamber communicating with said first mentioned chamber through said inlet, a member in said second mentioned chamber having a portion movable through said inlet toward and away from said opening to vary the width of the gap between said inlet and said opening for affecting the amount of fluid flowing directly into said impeller, a third chamber in said casing, a second member in said third chamber secured to said first mentioned member, resilient means in said third chamber engaging said second mentioned member for normally urging said first mentioned member away from said opening, means in said third mentioned chamber for urging said second mentioned member under pressure to move said first mentioned member towards said opening, a conduit connecting said outlet and said third mentioned chamber for transmitting pressure from said outlet to said third mentioned chamber, and means connected to said outlet and to said third mentioned chamber and responsive to pressure at said outlet and affecting the pressure on said second mentioned means for stabilizing pressure at said outlet.

4. A pump control means having in combination, a pump comprising a casing having a chamber therein, said chamber having an inlet and an outlet, a shrouded impeller rotatably located in said chamber, a second chamber in said casing communicating with said first mentioned chamber through said inlet, a member in said second mentioned chamber movable through said inlet to vary the flow of fluid directly into said impeller, a third chamber in said casing, a second member in said third mentioned chamber movable in one direction by pressure at said outlet, a conduit for transmitting said pressure from said outlet to said third mentioned chamber, a resilient means in said third mentioned chamber for moving said second mentioned member in the opposite direction, said second mentioned member being connected to said first mentioned member for moving the latter, and hydraulic means connected to said outlet and to said third mentioned chamber and responsive to said pressure at said outlet for producing a balance between said resilient means and said pressure at said outlet for moving said second mentioned member and said first mentioned member to a position which will produce a constant pressure at said outlet.

5. A pump control means having in combination, a pump comprising a casing having a chamber therein, said chamber having an inlet and an outlet, a shrouded impeller rotatably located in said chamber, a second chamber in said casing, a member in said second mentioned chamber movable to vary the flow of fluid to said impeller, a third chamber in said casing, a second member in said third mentioned chamber movable in one direction by pressure at said outlet, and resilient means in said third mentioned chamber for moving said second mentioned member in the opposite direction, said second mentioned member being connected to said first mentioned member for moving the latter, and means responsive to pressure at said outlet and connected to said third mentioned chamber for stabilizing the position of said second mentioned member and said first mentioned member.

6. A pump control means having in combination, a pump comprising a casing, a chamber in said casing having an inlet and an outlet, a shrouded impeller rotatably located in said chamber, a second chamber in said casing communicating with said first chamber through said inlet, a member in said second chamber movable to vary the flow of fluid through said inlet directly into said impeller, a third chamber in said casing, a second member in said third chamber movable in one direction by pressure at said outlet, a conduit for transmitting pressure from said outlet to said third mentioned chamber, resilient means in said third mentioned chamber for moving said second mentioned member in the opposite direction, said second mentioned member being connected to said first mentioned member for moving the latter, means for connecting said third mentioned chamber to said inlet, and means actuated by the pressure at said outlet and connected to said third mentioned chamber for controlling the flow of fluid through said last mentioned chamber.

References Cited in the file of this patent

UNITED STATES PATENTS

| | | |
|---|---|---|
| 1,353,915 | Kime | Sept. 28, 1920 |
| 2,339,150 | Codrington | Jan. 11, 1944 |
| 2,357,527 | Lundquist | Sept. 5, 1944 |

FOREIGN PATENTS

| | | |
|---|---|---|
| 471,581 | Germany | Jan. 24, 1929 |